(No Model.) 3 Sheets—Sheet 1.
C. BERRYMAN.
Corn Planter.
No. 229,516. Patented July 6, 1880.
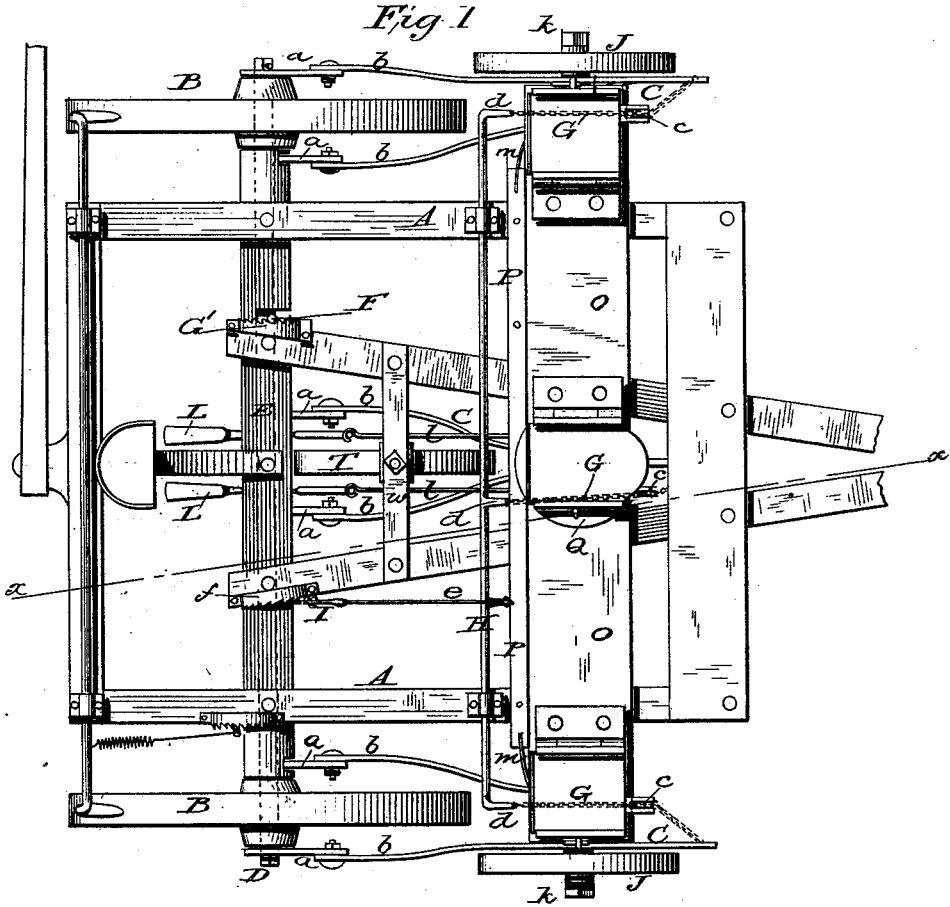
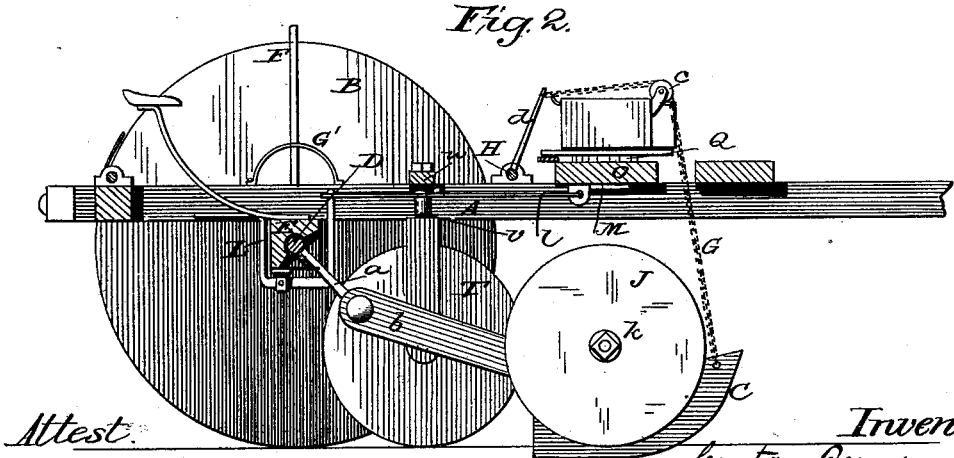
Attest:
Sidney P. Hollingsworth
Nathan C. Lane
Inventor
Cratus Berryman
By Dodge & Son
Attys.

(No Model.) 3 Sheets—Sheet 2.

C. BERRYMAN.
Corn Planter.

No. 229,516. Patented July 6, 1880.

Attest. Inventor.

(No Model.)  C. BERRYMAN.  3 Sheets—Sheet 3.
Corn Planter.

No. 229,516.  Patented July 6, 1880.

Attest.  Inventor
Piercy P. Hollingsworth  Oratio Berryman
Nathan C. Lane  By Dodge & Son
    attys.

N. PETERS, PHOTO-LITHOGRAPHER, WASHINGTON, D. C.

UNITED STATES PATENT OFFICE.

CRATON BERRYMAN, OF SYLVESTER, WISCONSIN.

CORN-PLANTER.

SPECIFICATION forming part of Letters Patent No. 229,516, dated July 6, 1880.

Application filed March 29, 1880. (No model.)

*To all whom it may concern:*

Be it known that I, CRATON BERRYMAN, of Sylvester, in the county of Green and State of Wisconsin, have invented certain Improvements in Corn-Planters, of which the following is a specification.

My invention relates to corn-planters, and more particularly to three-row machines; and the invention consists in devices for regulating the pressure and controlling the depth of the shoes and for raising or lowering two or more shoes simultaneously, in foot-levers and intermediate devices connecting them with the dropping-plates for actuating the latter, in a clearing device to keep the seed-cells open, and in various other details, hereinafter explained.

Figure 3:
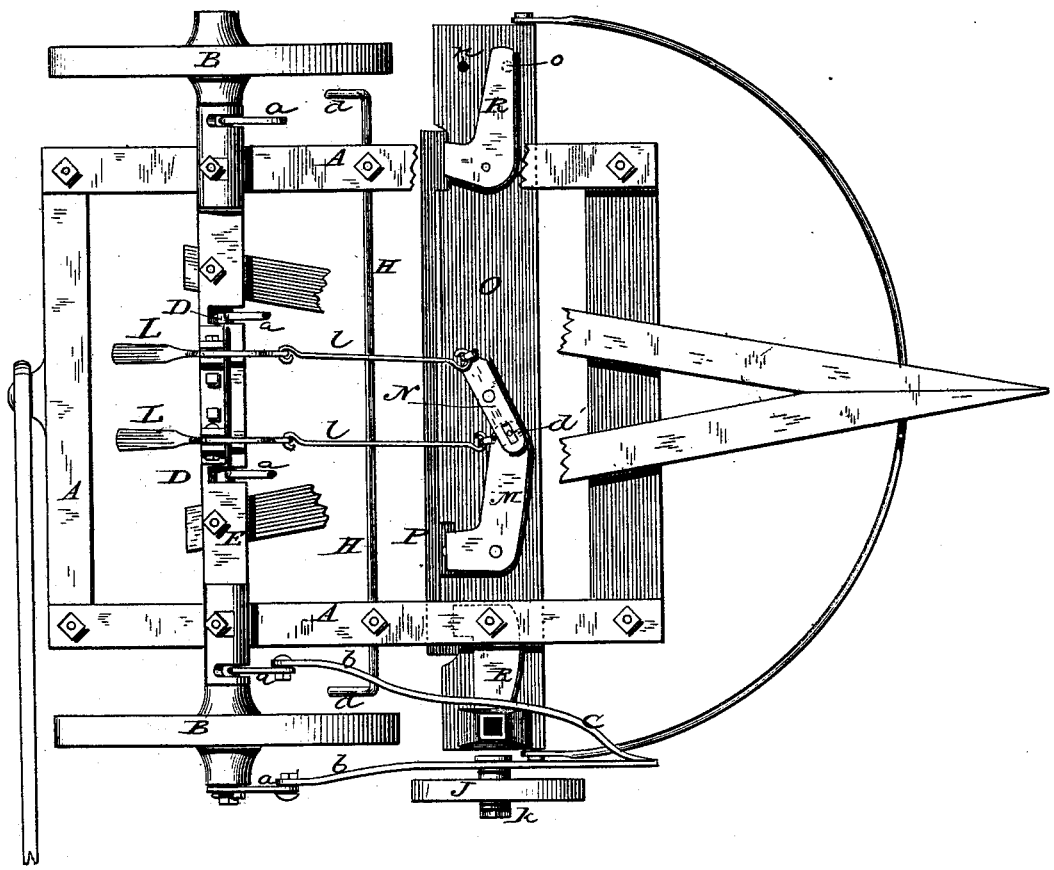
Figure 4:
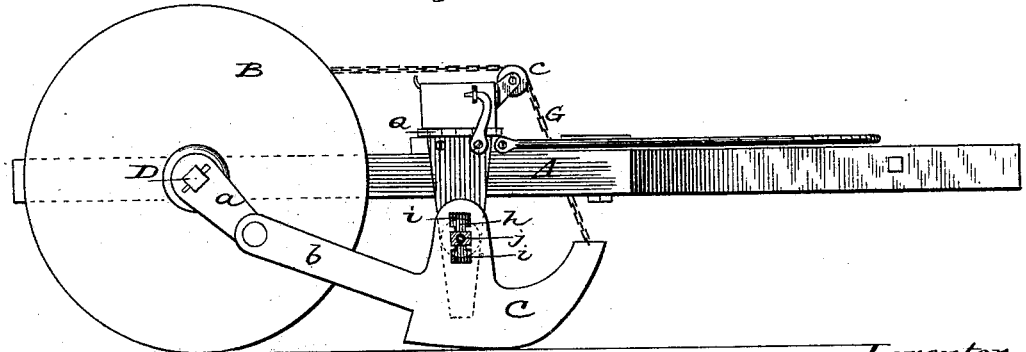
Figure 5:
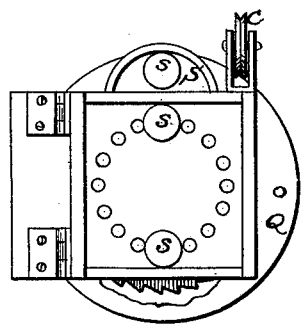
Figure 6:
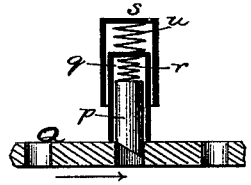
Figure 7:
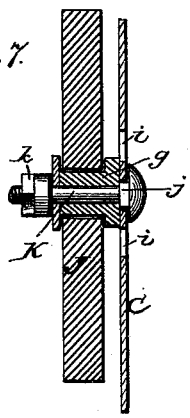
Figure 8:

In the accompanying drawings, Figure 1 represents a top-plan view of my improved machine; Fig. 2, a section from front to rear on the line $x\ x$ of Fig. 1; Fig. 3, an under-face view of the machine with portions broken away to show the working parts; Fig. 4, a side elevation; Fig. 5, a plan view of one of the seed-hoppers, showing the seed-plate and the pumpkin-seed hopper; Fig. 6, a vertical central section of the clearing device; Fig. 7, a vertical central section through the side of the shoe and the gage-wheel, illustrating the manner in which the latter is adjusted; Fig. 8, a perspective view of the gage-wheel-supporting bolt.

Hitherto much difficulty has been experienced in the use of this class of planters, owing to the fact that in hard or compact soils the shoe would not properly cut and enter the ground, while in loose free soils the shoe would often run too deep, the weight resting upon the shoe being the only force acting to cause its entrance into the ground.

To remedy this defect constitutes the first object of my invention; and to this end I provide means for elevating the heel or the toe of the shoe, according to the penetration desired and the nature of the soil. This arrangement will be readily understood upon referring to the drawings, in which—

A represents the usual rectangular frame, supported upon wheels B and provided with shoes or runners C, which open the ground for the reception of the seed delivered by the several dropping devices located above.

The wheels B are mounted upon opposite ends of a round axle or shaft, D, passing longitudinally through a cross-beam, E, which serves to give stiffness to the axle, and as a bearing in which the same may turn. The shaft or axle D is furnished with an upright hand-lever, F, by which it may be partially rotated, said lever being held at any desired point by a toothed or notched rack, G', as shown.

Extending from the shaft or axle D at suitable points are rigid arms $a$, arranged in pairs, said arms extending forward and being connected by loose joints to backwardly-extending arms $b$, formed upon or rigidly attached to the shoes or runners C, so that by drawing back the hand-lever F the heels of the runners or shoes C may be elevated, while by moving it in the reverse direction they may be lowered or depressed.

The forward end of each shoe or runner C is sustained and regulated in height by a chain, G, passing upward over a pulley, $c$, the several chains being connected to arms $d$ of a rock-shaft, H, running parallel with the axle D, mounted in bearings, and furnished with a controlling hand-lever, I, with which it is connected by a rod, $e$, the lever I being arranged to lock in notches in a curved rack, $f$, to hold it in its adjusted position.

By the above-described means the heel or the point of the shoe or runner may be depressed or elevated, and the penetration thereby regulated.

In order to regulate and control the depth to which the shoe or runner may sink each shoe is furnished with a vertically-adjustable gage-wheel, which, instead of being attached either in front or in rear, as heretofore, is attached to the side of the shoe, thus permitting the proper adjustment of either the heel or the point.

The wheel is indicated in the various figures by the letter J, and its manner or means of adjustment is illustrated in Figs. 4, 7, and 8, a tubular sleeve or axle, $g$, being provided for it and clamped to the side of the shoe by a central bolt, K, as shown. The sleeve or axle $g$ is formed with a shoulder or enlargement at its inner end, against which the gage-wheel may bear, while at the outer end of the sleeve or axle a washer is placed upon the bolt K, as shown in Fig. 7, the space between the shoulder and the washer being sufficient to permit the free rotation of the wheel J. In order to permit the ready adjustment of the wheel as to height there is formed in the side of the shoe C a vertical slot or opening, $h$, of the width of the shank of bolt K, and the sides of said slot are formed with notches or recesses $i$, as shown in Fig. 4, of proper size to receive a squared or rectangular enlargement, $j$, formed upon the bolt next to its head. The bolt is passed through the slot $h$ from the inside of the shoe, and the enlargement $j$ passed into one of the openings or seats $i\,i$, as in Fig. 4. The sleeve or axle $g$ is placed thereon, the wheel J placed upon the axle, the washer applied, and the several parts drawn firmly to place by means of a nut, $k$. By turning back the nut a short distance the enlarged portion $j$ may be made free to be moved back and disengaged from its notch, bringing the shank of the bolt into the slot $h$, in which it may be adjusted vertically. When at the desired point the squared portion is again drawn into one of the openings $i\,i$, and the nut tightened to clamp the parts firmly in place. The bolt K will, of course, be sufficiently long to permit the nut to be turned back without being removed from the bolt.

As ordinarily constructed, corn-planters are provided with a hand-lever, by which the seed-dropping devices are operated. This construction necessitates the employment of two persons in the management of the machine, one to drive and the other to operate the droppers, or requires the driver to divide his attention between the team and the machine, which may not be done to advantage. To enable one person to perform the duties of the two commonly employed I provide foot-levers, and connect the same by suitable intermediate devices with the dropping devices, thus enabling the driver to operate the latter with his feet, and leaving his hands free to manage the team. The arrangement of parts which I prefer to use for this purpose is illustrated in Figs. 1 and 3, in which L L are the foot-levers, placed in convenient position below and a little in front of the driver's seat, and hung or pivoted upon the lower side of the cross-beam E, through which the axle passes.

The foot levers or treadles L L are connected, respectively, with levers M and N, pivoted to the under side of the bed or platform O, upon which the seed-hoppers are mounted, by means of rods $l\,l$, as shown.

The lever M is of right-angle or elbow form, and has one of its arms bent upward and connected with a reciprocating bar, P, the rod $l$ being attached to the other arm.

The lever N is a simple straight bar, pivoted at its middle, connected at one end by the rod $l$ with one of the foot-levers L, and slotted at its opposite end to receive a pin, $d'$, on the lever M, the position and arrangement of the parts being clearly indicated in Fig. 3.

When the parts are thus arranged and connected it will be seen a movement of one treadle will draw back the connected ends of levers M N, thus moving bar P in one direction, while the depression of the other treadle will, by drawing back the free end of lever N, throw the connected ends of said levers forward and cause the bar P to move in the reverse direction.

The bar P is furnished with spring-arms $m$, one for each seed-plate, which engage with the toothed or notched edges of the seed-plates Q and cause said plates to advance the space of one tooth at each forward movement of the bar P. Each plate Q is mounted at the bottom of a seed-box or hopper, and is furnished with a circular row of seed cells or openings, as shown in Fig. 5, two delivery-openings being made through the bed or platform O for each plate, the seed being dropped through the same alternately. This alternate dropping of the seed is effected by the use of a cut-off or covering finger, R, arranged to move from one delivery-opening to the other.

For the middle hopper the lever M is caused to serve as a cut-off, while for the side hoppers or dropping devices covering-fingers R, of like form, and connected in the same manner with the slide P, are employed. This arrangement causes seed to be delivered both on the forward and backward movement of the bar P, the forward movement carrying seed to the rear opening, $n$, and dropping it through the same, the finger or arm R being simultaneously moved to the forward opening, $o$, into which seed is likewise dropped, but from which it is prevented by the cut-off finger from escaping. On the backward movement of the rod or bar P the plates Q stand still, but the cut-off finger of each is carried backward from the forward opening, $o$, to the rear opening, $n$, allowing the seed to drop from the former.

In order to keep the seed-cells open, prevent the seed from falling through the same except in proper quantity, and avoid the backward rotation of the seed-plates by the backward movement of the bar P, I place in each seed-hopper, directly over the delivery-passages $n$ $o$, a clearing stem or plunger, $p$, mounted in a thimble, $q$, from which it is urged outward by a spring, $r$, the thimble $q$ being, in turn, mounted in a second thimble, $s$, and urged outward by a spring, $u$, as shown in Fig. 6. The stem $p$ is beveled at the end in such manner that while its forward edge or side extends into the seed-cell below it, its rear edge remains always slightly above the upper face of the seed-plate Q, so that upon the rotation of the latter it may lift the stem, while the plate is held firmly against a backward rotation.

The stem $p$, pressing down upon the seed in the cell, insures the delivery of the same therefrom, while the thimble $q$, which is of larger diameter than the seed-cell, serves to remove all seed except that within the cell as the latter moves over the delivery-opening.

The stem or plunger p may be shouldered or otherwise prevented from entering too deeply into the seed-cells.

In planting corn it is often desirable to plant in occasional hills, or at suitable distances apart, pumpkin-seed, and to enable this to be done without additional trouble I provide one or more of the seed-dropping devices with a seed-plate having any desired number of openings through it for the delivery of such seed, and I attach to one side of the hopper a supplemental hopper, S, in which the pumpkin-seed are placed, the openings in the seed-plate therefor being outside of the main hopper, as shown in Fig. 5. Suitable openings will of course be made through the bed or platform O for the passage of the pumpkin-seed.

The next feature of my invention consists in a covering-wheel for the middle shoe or runner, the object being to permit the adjustment of said wheel without reference to the main wheels B B, which act as coverers for the outer shoes or runners. To secure this result the covering-wheel T is mounted in a fork, the upper end of which is formed with an elongated cylindrical neck or stem, v, arranged to slide freely through its supporting-bar w, and thereby to rise and fall to adapt itself to the inequalities of the ground. The arrangement of the wheel in this manner also permits it to adjust itself in turning the machine so as to turn therewith, instead of dragging or scraping sidewise over the ground.

I am aware that clearers of various forms have been provided for keeping the seed-cells open, and I lay no claim thereto, broadly considered; but by the peculiar construction and arrangement of my clearer it is caused to serve both in the capacity of a clearer and a stop or detent to prevent any backward rotation of the feed plate or disk, the beveled end permitting the plate to ride under and raise the plunger, and the vertical front face engaging directly behind and against the front wall or side of the seed-cell.

Having thus described my invention, what I claim is—

1. In combination with the shoe or runner, the rock-shafts D and H, connected, respectively, with the heel and point thereof in the manner shown, whereby the heel may be raised or depressed and the point elevated or lowered.

2. In combination with the shoe or runner of a corn-planter, a gage-wheel located at the side of the same, as described, whereby either end of the shoe may be adjusted vertically without altering the adjustment of the wheel.

3. In combination with the shoe or runner having the slot h and notches i, the bolt K, having a squared portion to fit the notches, the sleeve or axle g, nut k, and wheel J, all arranged and operating as described.

4. In combination with the bar P, the levers M N, treadles L, and rods l, arranged and operating as described.

5. In combination with a rotating feed-plate, a vertically-moving plunger or pin, p, having its lower end beveled, as shown and described, and adapted to enter the seed-cells and engage with the forward side thereof, whereby it is adapted both to clear the cells and to prevent any backward rotation of the plate.

CRATON BERRYMAN.

Witnesses:
BROOKS DUNWIDDIE,
HENRY H. COHN.